(12) United States Patent
Chou et al.

(10) Patent No.: US 6,282,474 B1
(45) Date of Patent: Aug. 28, 2001

(54) METHOD AND APPARATUS FOR DETECTING ROLLOVER OF AN AUTOMOTIVE VEHICLE

(75) Inventors: Clifford C. Chou, Farmington Hills; Fubang Wu, Rochester Hills; Mukesh J. Amin, Canton, all of MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/589,181

(22) Filed: Jun. 4, 2000

(51) Int. Cl.$^7$ ................................................. B60R 22/00
(52) U.S. Cl. ..................... 701/45; 701/38; 180/271; 180/282; 340/429; 340/440
(58) Field of Search ................................. 701/36, 37, 38, 701/45, 70; 180/271, 282, 89.14; 280/6.16; 307/9.1, 10.1; 340/429, 436, 440, 689

(56) References Cited

U.S. PATENT DOCUMENTS

| | | |
|---|---|---|
| 5,034,620 | * 7/1991 | Cameron ............................ 307/10.7 |
| 5,161,816 | 11/1992 | Okuda et al. . |
| 5,480,186 | 1/1996 | Smith . |
| 5,610,575 | 3/1997 | Gioutsos . |
| 5,825,284 | 10/1998 | Dunwoody et al. . |
| 6,002,975 | * 12/1999 | Schiffmann et al. ................ 701/36 |
| 6,070,681 | * 6/2000 | Catanzarite et al. ............. 180/89.15 |

* cited by examiner

*Primary Examiner*—Tan Nguyen
*Assistant Examiner*—Yonel Beaulieu
(74) *Attorney, Agent, or Firm*—David Kelley

(57) ABSTRACT

A rollover sensing system (12) that may be used in the determination of when to deploy restraints in the vehicle. The rollover sensing system (12) may include lateral acceleration sensors (32), a roll rate sensor (18) and a roll angle detector (20). A control circuit (16) determines a predetermined rollover threshold in response to the roll rate and roll angle detector (20) and calculates an adjusted threshold as a function of the predetermined rollover threshold and the lateral acceleration. The control circuit (16) generates a control signal in response to the adjusted threshold.

21 Claims, 3 Drawing Sheets

METHOD AND APPARATUS FOR DETECTING ROLLOVER OF AN AUTOMOTIVE VEHICLE

TECHNICAL FIELD

The present invention relates generally to detecting rollover for an automotive vehicle, and more specifically, to a method and apparatus particularly suited for detecting rollover to trigger an occupant restraint system.

BACKGROUND

Occupant restraint systems and, in particular, inflatable occupant restraint systems, are increasingly being used in automotive vehicles. Nearly every vehicle now produced has driver and passenger front airbags. Side airbags are also increasingly being used in automotive vehicles. Side airbags use lateral acceleration sensors to detect the lateral acceleration of the vehicle and thus the presence of a side impact. In response to lateral acceleration, the side airbags are deployed.

Another newer type of inflatable occupant restraint system is a side curtain airbag. The side curtain airbag deploys from the ceiling or near the roof header and extends downward in front of the side windows of the vehicle. This system is designed to protect occupants in rollover conditions.

Another type of non-inflatable system is a pretensioner system coupled to the seat belt. A pretensioner system reduces the amount of play in the seat belts upon a sensed condition.

Each of the above systems may potentially be employed during rollover of a vehicle. Commonly, an energy-based model is used to determine when rollover occurs. Therefore, an accurate determination of rollover is desirable for use in determining when to deploy the restraints.

SUMMARY OF THE INVENTION

The present invention provides an improved rollover sensing system that may be used in the determination of when to deploy restraints in the vehicle. The rollover sensing system includes lateral acceleration sensors, a roll rate sensor, and a roll angle detector. A control circuit determines a predetermined rollover threshold in response to the roll rate and roll angle detector and calculates an adjusted threshold as a function of the predetermined rollover threshold and the lateral acceleration. The control circuit generates a control signal in response to the adjusted threshold.

In a further aspect of the invention, the rollover sensing system may be employed by an occupant restraint system to determine when the occupant restraint should be deployed.

In a further aspect of the invention, a method of detecting rollover in a vehicle comprises the steps of:

determining an energy rollover threshold;

determining an adjusted threshold as a function of said energy rollover threshold and lateral acceleration; and generating a control signal in response to the adjusted threshold.

One advantage of the invention is that a robust and reliable determination of rollover is used to improve an energy-based rollover prediction.

Other objects and features of the present invention will become apparent when viewed in light of the detailed description of the preferred embodiment when taken in conjunction with the attached drawings and appended claims.

DETAILED DESCRIPTION OF THE PREFERRED EMBODIMENT

Figure 1:
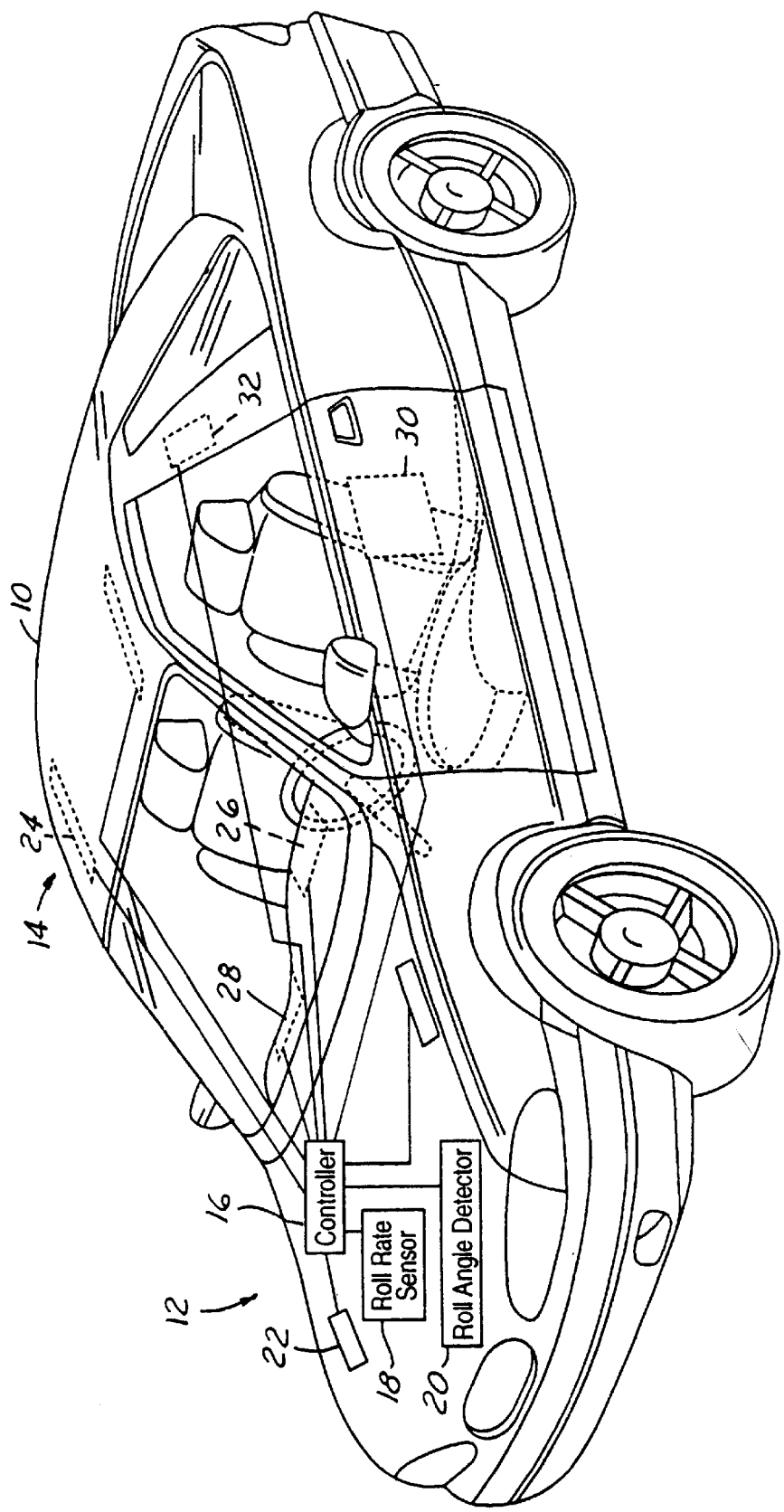
FIG. 1 is a perspective view of an automotive vehicle having a rollover sensing system according to the present invention.

In the following figures, the same reference numerals are used to identify the same components in the various views. As described, the rollover detection system is particularly suitable for use in an occupant restraint system. However, the rollover sensing system may also be incorporated into a dynamic control system for an automotive vehicle, and other systems as would be evident to those skilled in the art.

Referring now to FIG. 1, an automotive vehicle 10 has a rollover sensing system 12 coupled to an occupant restraint system 14. Rollover sensing system 12 includes a control circuit 16. Control circuit 16 is preferably microprocessor-based. Controller 16 may be shared with occupant restraint system 14. However, occupant restraint system 14 may have its own controller. Rollover sensing system 12 comprises a roll rate sensor 18, a roll angle detector 20, and a pair of lateral acceleration sensors 22.

Roll rate sensor 18 provides a roll rate signal that corresponds to the rate of roll of the vehicle about a roll axis. Various types of roll rate sensors would be evident to those skilled in the art.

Roll angle detector 20 provides a signal indicative of the roll angle of the vehicle. The roll angle is the amount the vehicle is tilted from a horizontal position. Roll angle detector 20 may be a sensor or may be a calculation based upon roll rate sensor 18. For example, if roll rate is integrated over time, an amount of roll from the at rest position may be determined. However, if the vehicle was at rest on an incline, integrating the roll rate signal may not be entirely accurate but may be acceptable. Preferably, however, roll rate and roll angle are determined independently.

Two lateral acceleration sensors 22 are illustrated. Lateral acceleration sensors 22 may be part of a side impact detection system or may be sensors specifically designed for rollover sensing system 12. Known lateral acceleration sensors include piezoelectric and silicon micromachined devices. Of course, one skilled in the art may recognize that only one lateral acceleration sensor 22 may be employed. Lateral acceleration sensors 22 generate a lateral acceleration signal corresponding to lateral or sideways movement of the vehicle. The lateral acceleration signal is indicative of the severity of sideways movement of the vehicle. Therefore, the severity and speed of a side impact or rollover may be indicated by lateral acceleration sensor 22.

Control circuit 16 may be used to determine a rollover threshold in response to a roll rate signal and a roll angle signal. The rollover threshold is an energy-based indication of rollover of the vehicle. The control circuit 16 may also be used to calculate an adjusted threshold based on the lateral acceleration signal and the energy-based rollover threshold. Control circuit 16 may also control occupant restraint system 14.

In addition to control circuit 16, occupant restraint system 14 may include restraint devices such as an inflatable curtain airbag 24, a driver side front airbag 26, a passenger side front airbag 28, a side airbag 30, and a belt retractor 32. Of course, one or more restraint devices may be used in restraint system 14. Control circuit 16 may be used to control the actuation of each of the restraints 24 through 32. However, as one skilled in the art would recognize, various other sensors and separate controllers may also be used to control each of the occupant restraint devices 24 through 32.

Figure 2:
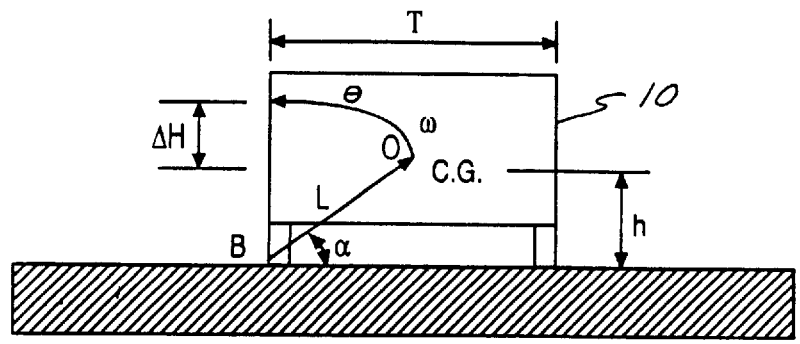
FIG. 2 is a simplified end view of an automotive vehicle at rest according to the present invention.
Figure 3:
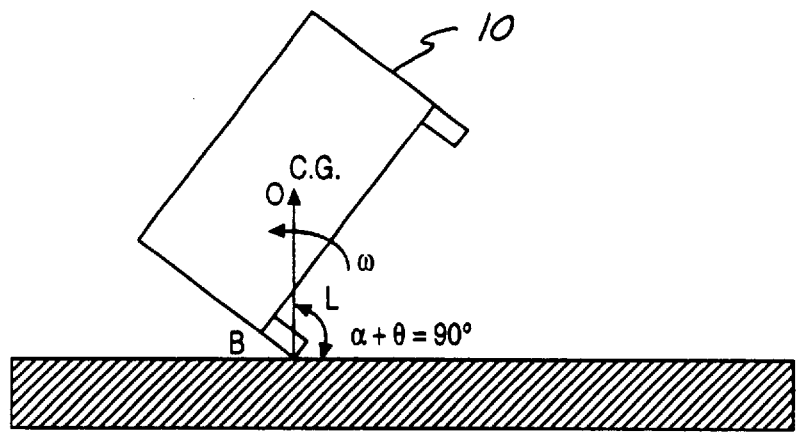
FIG. 3 is a simplified end view of an automotive vehicle at a rollover condition.

Referring now to FIGS. 2 and 3, energy-based criteria for a rigid body based on vehicle kinematics is illustrated by end view of automotive vehicle 10. In FIGS. 2 and 3, the potential energy which is required to cause the vehicle to roll depends on the change in height of the center of mass O, ΔH. This energy can be expressed as:

$$E1 = \Delta H mg = (L-h)mg$$

where m is the mass of the vehicle and g is the gravitational constant.

Also, the total energy a vehicle possesses consists of two parts, the potential energy and the kinematic energy.

$$E2 = (L \times \sin(\alpha + \theta) - h)mg + \frac{1}{2}I_O\omega^2$$

where θ is the angular displacement, Io is the moment of inertia of the vehicle with respect to the point O, the center of mass, and ω is the vehicle rotational velocity.

If the total energy E2 is greater than the potential energy E1, then the vehicle rollover will occur. An index (or measurement), $I_{Index}$ can be defined as:

$$I_{Index} = E1 - E2$$

which when substituted from above is:

$$I_{Index} = L(1 - \sin(\alpha + \theta))mg - \frac{1}{2}I_O\omega^2$$

where α=a tan(2 h/T) which is the so-called "Stability Index" for propensity using the vehicle center of gravity CG height and track width as parameters.

Figure 4:
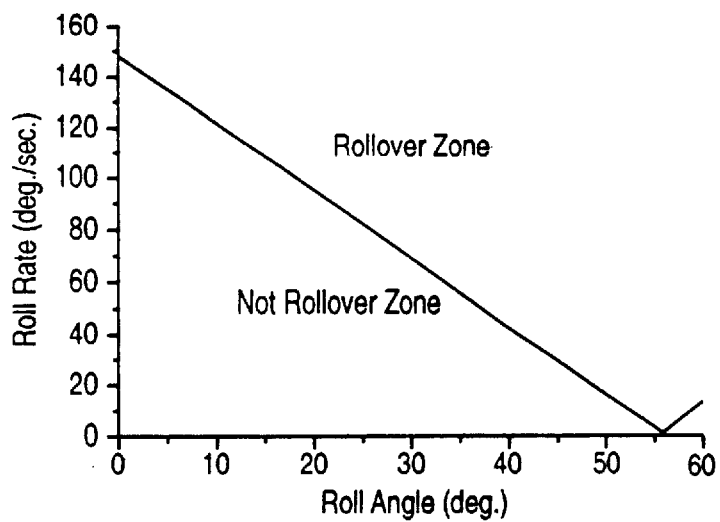
FIG. 4 is a plot of roll rate versus roll angle showing an energy-based roll threshold for a vehicle.
Figure 5:
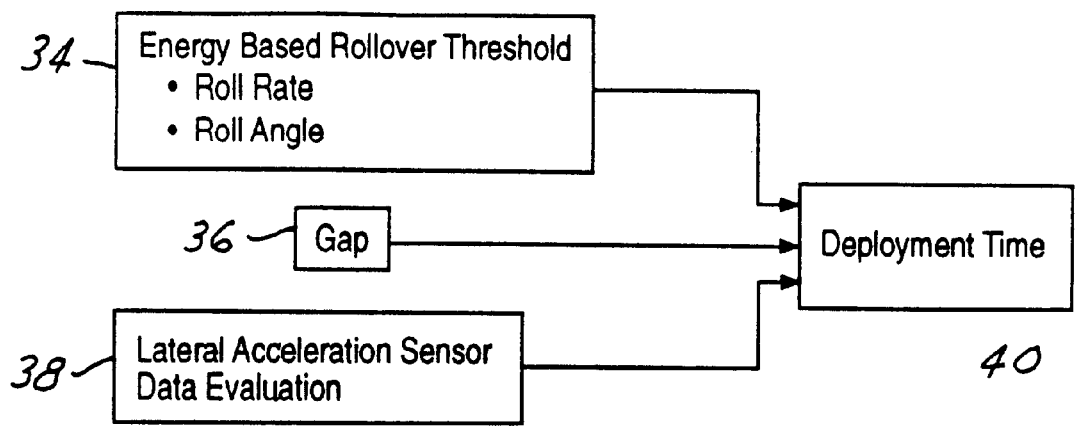
FIG. 5 is a simplified block diagram of a deployment process employing a rollover detection system according to the present invention.

Referring now to FIG. 5, functional block diagram of a deployment system according to the present invention is illustrated. An energy-based rollover threshold block 34, a gap block 36, and a lateral acceleration sensor data block 38 provide input to a deployment time block 40. Energy-based rollover threshold 34 is determined as described above with respect to FIGS. 2 through 4. Gap 36 is defined as the amount of clearance from the body of the vehicle occupant to the inside of the vehicle. Depending on the particular occupant restraint, gap may be defined as the distance from the head of the occupant to the inside of the vehicle or from the shoulder of the occupant to the inside of the vehicle.

Lateral acceleration data block 38 is derived from the lateral acceleration sensors. Preferably, the lateral acceleration sensor signal is filtered as would be evident to those skilled in the art. Lateral acceleration sensor data 38 provides an indication as to the severity and speed of the lateral movement of the vehicle and thus indicating how fast the occupant's movement to the gap closure.

Deployment time block 40 is preferably performed in control circuit 16. A time-to-fire is derived from the energy-based rollover threshold and block 34. Also, a time-to-fire based on the gap requirement is determined in block 36. The deployment time block 40 may thus provide a deployment time based on the energy-based rollover threshold and gap requirement 36. In practice, these two elements are considered together to determine an overall deployment time. Lateral acceleration sensor data 38 provides an indication as to the severity of an event. If the severity of an event is above a predetermined level as indicated by lateral acceleration 38, the energy-based threshold may be required to be reduced by a predetermined amount. Thus, if lateral acceleration sensor data is above a predetermined internal acceleration, the energy based threshold is reduced a predetermined amount so that the time-to-fire is reduced. The amount of the reduction will depend on the particular vehicle dynamics and structure.

In a production setting, the various parameters may be stored in a lookup table within control circuit 16. Thus the time-to-fire or threshold based upon the energy of the vehicle and the gap may be reduced by a predetermined amount depending on the data from the lateral acceleration sensor.

Figure 6:
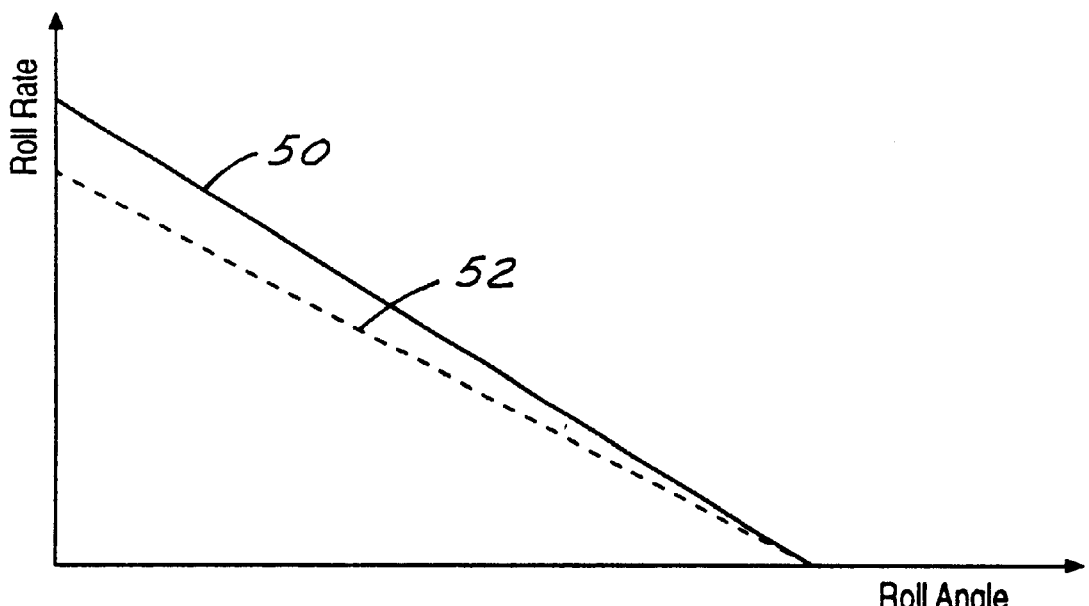
FIG. 6 is a plot of roll rate vs. roll angle for an energy-based threshold and an adjusted threshold using lateral acceleration data.

Referring now to FIG. 6, a plot of an energy-based threshold 50 (determined in blocks 34 and 40 above) may also have the gap requirement factored in. However, if lateral acceleration exceeds a predetermined amount, an adjusted threshold 52 may be used to determine the deployment time. As illustrated, the slope of the energy-based threshold is reduced to form adjusted threshold 52.

While particular embodiments of the invention have been shown and described, numerous variations alternate embodiments will occur to those skilled in the art. Accordingly, it is intended that the invention be limited only in terms of the appended claims.

What is claimed is:

1. A rollover sensing system comprising:
   a lateral acceleration sensor generating a lateral acceleration signal;
   a roll rate sensor generating a roll rate signal;
   a roll angle detector generating a roll angle signal;
   a control circuit determining a predetermined rollover threshold in response to said roll rate and roll angle sensor, calculating an adjusted threshold as a function of said predetermined rollover threshold and said lateral acceleration and generating a control signal in response to the adjusted threshold.

2. A rollover sensing system as recited in claim 1 wherein said predetermined rollover threshold is energy-based.

3. A rollover sensing system as recited in claim 1 wherein said adjusted predetermined rollover threshold is a function of roll rate and roll angle and lateral acceleration.

4. A rollover sensing system as recited in claim 1 wherein said rollover threshold is time to fire.

5. A rollover sensing system as recited in claim 1 wherein said roll angle and said roll rate are independently determined.

6. A rollover sensing system as recited in claim 1 wherein said control circuit determines said adjusted threshold when the lateral acceleration signal exceeds a predetermined lateral acceleration.

7. A rollover sensing system as recited in claim 1 wherein said adjusted threshold is a function of a gap requirement.

8. An occupant restraint system comprising:

an occupant restraint;

a deployment circuit coupled to said occupant restraint;

a lateral acceleration sensor generating a lateral acceleration signal;

a roll rate sensor generating a roll rate signal;

a roll angle detector generating a roll angle signal; and a control circuit determining a predetermined rollover threshold in response to said roll rate and roll angle sensor, calculating an adjusted threshold as a function of said predetermined rollover threshold and said lateral acceleration signal and generating a control signal in response to the adjusted threshold.

9. An occupant restraint system as recited in claim 8 wherein said occupant restraint is selected from the group consisting of: an inflatable curtain, a driver side front airbag, a passenger side airbag, a retractor and a side airbag.

10. An occupant restraint system as recited in claim 8 wherein said predetermined rollover threshold is energy-based.

11. An occupant restraint system as recited in claim 8 wherein said predetermined rollover threshold is a function of roll rate, roll angle and lateral acceleration.

12. An occupant restraint system as recited in claim 8 wherein said rollover threshold is time to fire.

13. An occupant restraint system as recited in claim 8 wherein said roll angle and said roll rate are independently determined.

14. An occupant restraint system as recited in claim 8 wherein said control circuit determines said adjusted threshold when the lateral acceleration signal exceeded a predetermined lateral acceleration.

15. An occupant restraint system as recited in claim 8 wherein said adjusted threshold is a function of a gap requirement.

16. A method of detecting rollover in a vehicle comprising the steps of:

determining an energy rollover threshold;

determining an adjusted threshold as a function of said energy rollover threshold and lateral acceleration; and generating a control signal in response to the adjusted threshold.

17. A method of detecting rollover as recited in claim 16 performing the step of determining an adjusted threshold when lateral acceleration exceeds a predetermined lateral acceleration.

18. A method of detecting rollover as recited in claim 16 wherein said energy rollover threshold is function of gap.

19. A method of detecting rollover as recited in claim 16 wherein said step of determining an adjusted rollover comprises obtaining lateral acceleration from a side impact accelerometer.

20. A method of detecting rollover as recited in claim 16 wherein said energy rollover threshold is a function of roll rate and roll angle.

21. A method of detecting rollover as recited in claim 16 wherein said roll angle and roll rate are independently determined.

* * * * *